United States Patent
Kumar et al.

(10) Patent No.: US 9,937,475 B2
(45) Date of Patent: Apr. 10, 2018

(54) DYNAMIC SEAL TO ENABLE MOVEMENT OF A FILM OR FIBER THROUGH A PRESSURIZED SPACE WHILE MAINTAINING A DESIRED PRESSURE

(71) Applicant: University of Washington through its Center for Commercialization, Seattle, WA (US)

(72) Inventors: Vipin Kumar, Seattle, WA (US); Andrei Nicolae, Seattle, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 108 days.

(21) Appl. No.: 14/779,935

(22) PCT Filed: Mar. 26, 2014

(86) PCT No.: PCT/US2014/031906
§ 371 (c)(1),
(2) Date: Sep. 24, 2015

(87) PCT Pub. No.: WO2014/160800
PCT Pub. Date: Oct. 2, 2014

(65) Prior Publication Data
US 2016/0045879 A1    Feb. 18, 2016

Related U.S. Application Data

(60) Provisional application No. 61/805,581, filed on Mar. 27, 2013.

(51) Int. Cl.
| F16J 15/16 | (2006.01) |
| B01J 3/02 | (2006.01) |
| B29C 44/34 | (2006.01) |

(52) U.S. Cl.
CPC .............. *B01J 3/02* (2013.01); *B29C 44/3453* (2013.01); *F16J 15/16* (2013.01)

(58) Field of Classification Search
CPC .... F16J 15/14; F16J 15/40; F16J 15/50; F16J 15/16; B10J 3/02; B29C 44/34
See application file for complete search history.

(56) References Cited

U.S. PATENT DOCUMENTS

| 3,578,788 A | 5/1971 | Potter, Jr. |
| 4,540,183 A * | 9/1985 | Schneider ................ F16J 15/10 |
| | | 277/312 |
| 5,193,703 A | 3/1993 | Staats, III |

(Continued)

OTHER PUBLICATIONS

International Search Report and Written Opinion dated Nov. 5, 2014, issued in corresponding International Application No. PCT/US2014/031906, filed Mar. 26, 2014, 10 pages.

*Primary Examiner* — Gilbert Y Lee
(74) *Attorney, Agent, or Firm* — Christensen O'Connor Johnson Kindness PLLC

(57) ABSTRACT

The present disclosure describes devices capable of continually and controllably passing a polymer film or fiber through a pressurized vessel, while maintaining a desired pressure inside the vessel. In certain embodiments, the devices of the present disclosure include dynamic seals capable of limiting the gas flow from the pressurized vessel to lower pressure environments.

10 Claims, 10 Drawing Sheets

(56) References Cited

U.S. PATENT DOCUMENTS

| | | | | |
|---|---|---|---|---|
| 5,562,295 A | * | 10/1996 | Wambeke | F16J 15/022 |
| | | | | 137/223 |
| 5,607,167 A | * | 3/1997 | Franckx | F16J 15/022 |
| | | | | 174/653 |
| 6,099,906 A | | 8/2000 | Palmer | |
| 2003/0047199 A1 | | 3/2003 | Worm | |
| 2006/0213488 A1 | | 9/2006 | Post | |
| 2008/0290545 A1 | | 11/2008 | Tubbs | |
| 2009/0309250 A1 | | 12/2009 | Nadella | |
| 2010/0221064 A1 | * | 9/2010 | West | F16B 43/001 |
| | | | | 403/288 |
| 2011/0127729 A1 | * | 6/2011 | Takeda | F16J 15/0818 |
| | | | | 277/592 |
| 2011/0147412 A1 | | 6/2011 | Hollars | |
| 2012/0018538 A1 | | 1/2012 | Moretti | |
| 2014/0264993 A1 | * | 9/2014 | Nadella | B29C 44/3453 |
| | | | | 264/51 |
| 2017/0174963 A1 | * | 6/2017 | Riepl | C09K 3/1018 |

* cited by examiner

DYNAMIC SEAL TO ENABLE MOVEMENT
OF A FILM OR FIBER THROUGH A
PRESSURIZED SPACE WHILE
MAINTAINING A DESIRED PRESSURE

CROSS-REFERENCE TO RELATED
APPLICATION

This application claims the benefit of U.S. Provisional Application No. 61/805,581, filed on Mar. 27, 2013.

BACKGROUND

Thermoplastic polymers are capable of being formed into cellular materials by a process generally known as solid-state foaming. Unlike the use of an extruder, wherein a thermoplastic polymer is melted to a liquid state into which a blowing agent is injected, the solid-state process does not melt the thermoplastic polymer via an extruder to inject the blowing agent, but instead, the thermoplastic polymer remains solidified during the process of absorbing a gas. Thereafter, the gas-saturated solid-state polymer is converted into a foam by raising the temperature. A solid-state foaming process is illustrated in FIG. 1.

The solid-state foaming process illustrated in FIG. 1, requires a solid-state thermoplastic polymer that has been saturated with gas. The foaming occurs while the polymer remains in the solid state either by a rapid decrease in pressure or through the application of heat. This process differs from extrusion foaming processes because the polymer is not required to be in a molten state when the gas is injected. Generally, at the beginning of the solid-state foaming method, block 100, the polymer is in equilibrium with the surrounding temperature and pressure so that the polymer is unsaturated. In block 102, the thermoplastic polymer is treated at an elevated pressure with an inert gas to cause the thermoplastic polymer to absorb the gas. Suitable gases may include non-reacting gases, such as carbon dioxide or nitrogen. The treatment of the polymer in block 102 may be carried out by placing the polymer in a pressure vessel which is sealed, and then the polymer is exposed to the inert gas at a high pressure. The highly pressurized gas will start to diffuse into the thermoplastic polymer over time, filling the polymer's free intermolecular volume. The gas will continue to saturate the polymer until a suitable gas concentration is reached or until equilibrium is reached. In block 104, the fully saturated or partially saturated polymer is removed from the saturation pressure vessel to an environment of lower pressure so that the polymer becomes thermodynamically unstable, meaning that the polymer is supersaturated with gas that is no longer at equilibrium with the surrounding environment. The polymer then desorbs gas from its surface into the surrounding environment. Desorption of some of the gas from the polymer's exterior surfaces will lead to, upon subsequent heating, the creation of a non-cellular skin at the exterior surfaces due to the lack of gas. Heating of the gas-saturated polymer in block 106 is carried out at a temperature below the melting temperature of the polymer. At a certain temperature, nucleation sites appear in the polymer-gas matrix, and further gas diffusion from the polymer-gas solution surrounding the sites causes the sites to form cells.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Some embodiments are related to a method of withdrawing a material from a pressurized vessel, wherein the method includes withdrawing a material from a gas-pressurized, liquid-filled vessel from a seal below a liquid level; applying a force with the seal on the material to limit a flow of liquid from the seal while creating a layer of liquid interposed between the material and the seal; and controlling a pressure within the vessel with a gas.

In some embodiments, the seal includes a first and second plate disposed generally parallel to each other, a first and second seal material juxtaposed on the interior sides of the first and second plates, and a film material is passed between the first and second seal materials while a liquid layer lubricates the sides of the film against the seal materials.

In some embodiments, the seal includes a chamber having a first larger diameter attached to the vessel, a second smaller diameter, and a transition that connects the larger diameter of the chamber to the smaller diameter of the chamber, and a seal material is placed inside the chamber, wherein the seal material is compressed against an inside wall of the transition, and a fiber material is passed within the seal material, while a liquid layer lubricates the sides of the fiber against the seal material.

In some or all embodiments, the gas can be carbon dioxide or nitrogen.

In some or all embodiment, the liquid can be water.

In some or all embodiments, the material can be a film.

In some or all embodiments, the material can be a gas-saturated film.

In some or all embodiments, the material can be a fiber.

In some or all embodiments, the material can be a gas-saturated fiber.

In some or all embodiments, the seal can extend axially.

In some or all embodiments, the seal material can be deformed to conform around the material to limit the flow of liquid out of the seal.

In some or all embodiments, the seal material can be polyurethane.

In some or all embodiments, the seal material can be permeable.

In some or all embodiments, the seal material can be non-permeable.

In some or all embodiments, the first and second plates can be parallel with respect to each other.

Some embodiments are related to a method of making a foam, wherein the method includes saturating a solid thermoplastic polymer with a gas within a gas-pressurized, liquid-filled vessel to produce a gas-saturated thermoplastic polymer; withdrawing the gas-saturated thermoplastic polymer from the vessel through a seal below a level of the liquid; applying a force with the seal on the gas-saturated thermoplastic polymer to limit a flow of liquid from the seal while creating a layer of liquid interposed between the gas-saturated material and the seal; and heating the gas-saturated thermoplastic polymer to a temperature to create cells without melting the thermoplastic polymer.

In some or all embodiments, the seal can be compressed around the gas-saturated thermoplastic polymer.

In some or all embodiments, the thermoplastic polymer can be a film or a fiber.

Some embodiments are related to a seal, wherein the seal includes a first structural member; a second structural member, wherein a first surface of the first structural member faces a second surface of the second structural member; a first seal material is juxtaposed on the first surface; a second seal material is juxtaposed on the second surface, wherein the first and second structural members are configured to be compressed toward one another to compress the first and second seal materials toward one another; and a vessel connected to the seal, wherein the vessel contains a liquid under pressure, wherein the liquid exerts pressure between the surfaces of the first and second seal materials.

In some or all embodiments, the first and second structural members can be parallel.

In some or all embodiments, the first and second seal materials can be non-permeable polymeric materials.

In some or all embodiments, the first and second seal materials can be permeable polymeric materials.

In some or all embodiments, the first and second seal materials can include alternating layers of permeable and non-permeable polymeric materials aligned axially.

In some or all embodiments, the first and second seal materials can include channels on surfaces that face one another.

In some or all embodiments, the first and second seal materials can define an aperture into the vessel.

In some or all embodiments, a cavity can be provided adjacent to each of the first and second seal materials, and each cavity is filled with pressurized liquid that applies a constant pressure along one side of each of the seal materials.

Some embodiments are related to a seal, wherein the seal includes a structural member having a wedge-shaped chamber, wherein the chamber has a larger diameter that tapers toward a smaller diameter; a seal material within the chamber that assumes the shape of the wedge-shaped chamber, wherein the seal material includes a hole axially traversing the seal material; and a vessel connected to the seal, wherein the vessel contains a liquid under pressure, wherein the liquid exerts pressure on the seal material and compresses the seal material in the wedge-shaped chamber.

In some embodiments, the seal may include a cavity provided between the structural member and the seal material, wherein the cavity is filled with pressurized liquid that applies a constant pressure along one side of the seal material.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
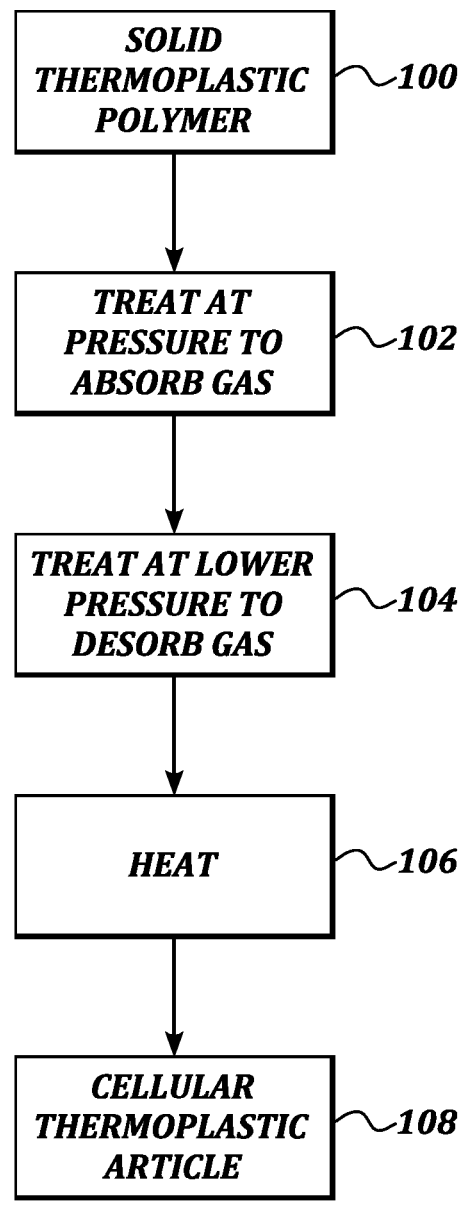
FIG. 1 is a flow diagram of a method according to a known solid-state foaming process.

A problem of solid-state foaming arises when the material to be foamed is thin. The time after a thin gas-saturated polymer is removed from the pressure vessel and before being heated causes the thin material to lose enough gas that renders foaming unsuitable. Accordingly, thin materials, such as films, sheets, or fibers, tend to be difficult to foam using a solid-state foaming process. To address the foregoing problem, a method and apparatus is disclosed that will allow a thin gas-saturated material to be withdrawn from a pressure vessel in a manner that lessens the amount of time the gas-saturated material is subjected to ambient pressure before heating.

Part of the problem may be due to the fact that in a conventional process, the material, such as a roll of film, is placed into a pressure vessel, and the entire roll of material is removed from the pressure vessel all at once. Therefore, while the initial material coming off the roll may have a suitable gas concentration, by the time the end or middle of the roll is reached, the gas concentration may be unsuitable for foaming. The disclosed method and apparatus allows the passing of a gas-saturated material into and/or out of a gas-pressurized, liquid-filled vessel so as to avoid disparities in gas concentration throughout the length of the material, and to allow for the immediate heating of the gas-saturated material into a foam. A particular seal is disclosed that allows the passing of a material into or out of the pressure vessel, without the pressure vessel seeing a significant amount of pressure loss via the seal, either through the loss of gas or liquid. A significant loss is one that is not possible to replenish with make-up liquid or gas.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings, and/or examples, making apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary, 3rd Edition, or a dictionary known to those of skill in the art, such as the Oxford Dictionary of Biochemistry and Molecular Biology (Anthony Smith (ed.), Oxford University Press, Oxford, 2004).

As used herein and unless otherwise indicated, the terms "a" and "an" are taken to mean "one," "at least one," or "one or more." Unless otherwise required by context, singular terms used herein shall include pluralities, and plural terms shall include the singular.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

All of the references cited herein are incorporated by reference. Aspects of the disclosure can be modified, if necessary, to employ the systems, functions, and concepts of the above references and application to provide yet further embodiments of the disclosure. These and other changes can be made to the disclosure in light of the detailed description.

Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The present disclosure describes seals capable of continually and controllably passing a polymer film or fiber through a pressurized vessel, while maintaining a desired pressure inside the vessel and a desired liquid level. In certain embodiments, the seals are capable of limiting the flow of gas and/or liquid from the pressurized vessel to lower pressure environments.

Normally, if an opening is created in a pressurized vessel, the pressurized gas or air or other liquid will leak out. Disclosed is a sealing mechanism that allows for a film or a fiber to freely pass through an inlet and/or an outlet in the vessel while keeping the desired pressure inside the vessel.

The disclosed method and dynamic seal may be used to continuously process micro-cellular and nano-cellular thin films and fibers. For examples of other methods of processing micro- and nano-cellular films and fibers, see U.S. Pat. Nos. 5,684,055; 7,807,260; 8,247,464; 8,168,114; 7,923,104; 8,241,741; and 8,357,319, which are incorporated herein by reference in their entirety. Since thin films quickly lose the absorbed gas when removed from a pressure vessel, the processing window is very small. Thus, if the film or fiber can be processed before gas desorbs, an industrially viable process can be envisioned for micro-cellular and nano-cellular films and fibers. A method for continuously feeding a gas-saturated thin polymer to a heater for foaming is disclosed.

In some embodiments, seals described herein use a liquid to provide a sealing function while the polymer film or fiber is moving through the seal. In some embodiments, the film or fiber are gas-saturated when exiting the vessel, however, in some embodiments, the film or fiber need not be gas-saturated within the vessel.

The short processing window has prevented the commercialization of the solid-state micro-cellular and nano-cellular processing of thin films and fibers. A solution to this problem is to continuously pass a polymer film or fiber through a pressurized environment and process it shortly after it exits the pressure vessel so that the gas has insufficient time to desorb out of the polymer.

Towards this end, devices are disclosed which are capable of continuously passing polymer films or fibers through a pressurized environment to continuously provide gas-saturated polymer films and fibers. In this way, not all of the gas-saturated fiber or film is exposed to atmospheric pressure. Instead the gas-saturated thin film or fiber is continuously fed to a heater, which allows the film or fiber to remain gas-saturated until it passes from the pressure vessel directly to the heater without an intermittent waiting period.

In certain embodiments, the devices of the present disclosure include, a pressurized vessel containing a pressurized gas and a liquid;

an inlet in the pressurized vessel capable of continuously accepting a polymer film;

an outlet in the pressurized vessel capable of continuously allowing the polymer films to exit the pressurized vessel while maintaining gas pressure in the pressurized vessel, wherein the outlet is a seal comprising:

a gas-tight aperture configured to securely conform to the shape of the polymer film or fiber.

In certain embodiments, the outlet is made of a sponge which contains a slit or hole through which the polymer film or fiber is passed.

In certain embodiments, the liquid contained in the pressurized vessel is selected from at least one of water, aqueous solutions, and oils. In certain embodiments, the liquid contains a combination of two or more liquids. In certain further embodiments, the liquid is a silicon oil.

In certain embodiments, the inlet in the pressurized vessel also comprises a gas-tight aperture configured to securely conform to the shape of the polymer film or fiber.

In certain embodiments. the gas in the pressurized container is selected from CO, $CO_2$, $O_2$, $N_2$, He, Ne, Ar, $H_2$, $NH_3$, $NO_2$, $CH_4$, $C_2H_6$, $C_3H_8$, $C_4H_{10}$, and the like.

In certain embodiments, the level of the outlet is below the level of the liquid in the pressurized vessel such that the polymer film or fiber exits the pressurized vessel immersed in the liquid.

Some embodiments are related to a method of withdrawing a material from a pressurized vessel, wherein the method includes withdrawing a material from a gas-pressurized, liquid-filled vessel from a seal below a liquid level; applying a force with the seal on the material to limit a flow of liquid from the seal while creating a layer of liquid interposed between the material and the seal; and controlling a pressure within the vessel with a gas.

In some embodiments, the seal includes a first and second plate disposed generally parallel to each other, a first and second seal material juxtaposed on the interior sides of the first and second plates, and a film material is passed between the first and second seal materials while a liquid layer lubricates the sides of the film against the seal materials.

In some embodiments, the seal includes a chamber having a first larger diameter attached to the vessel, a second smaller diameter, and a transition that connects the larger diameter of the chamber to the smaller diameter of the chamber, and a seal material is placed inside the chamber, wherein the seal material is compressed against an inside wall of the transition, and a fiber material is passed within the seal material, while a liquid layer lubricates the sides of the fiber against the seal material.

In some or all embodiments, the gas can be carbon dioxide or nitrogen.

In some or all embodiment, the liquid can be water.

In some or all embodiments, the material can be a film.

In some or all embodiments, the material can be a gas-saturated film.

In some or all embodiments, the material can be a fiber.

In some or all embodiments, the material can be a gas-saturated fiber.

In some or all embodiments, the seal can extend axially.

In some or all embodiments, the seal material can be deformed to conform around the material to limit the flow of liquid out of the seal.

In some or all embodiments, the seal material can be polyurethane.

In some or all embodiments, the seal material can be permeable.

In some or all embodiments, the seal material can be non-permeable.

In some or all embodiments, the first and second plates can be parallel with respect to each other.

Some embodiments are related to a method of making a foam, wherein the method includes saturating a solid thermoplastic polymer with a gas within a gas-pressurized, liquid-filled vessel to produce a gas-saturated thermoplastic polymer; withdrawing the gas-saturated thermoplastic polymer from the vessel through a seal below a level of the liquid; applying a force with the seal on the gas-saturated thermoplastic polymer to limit a flow of liquid from the seal while creating a layer of liquid interposed between the gas-saturated material and the seal; and heating the gas-saturated thermoplastic polymer to a temperature to create cells without melting the thermoplastic polymer.

In some or all embodiments, the seal can be compressed around the gas-saturated thermoplastic polymer.

In some or all embodiments, the thermoplastic polymer can be a film or a fiber.

Some embodiments are related to a seal, wherein the seal includes a first structural member; a second structural member, wherein a first surface of the first structural member faces a second surface of the second structural member; a first seal material is juxtaposed on the first surface; a second seal material is juxtaposed on the second surface, wherein the first and second structural members are configured to be compressed toward one another to compress the first and second seal materials toward one another; and a vessel connected to the seal, wherein the vessel contains a liquid under pressure, wherein the liquid exerts pressure between the surfaces of the first and second seal materials.

In some or all embodiments, the first and second structural members can be parallel.

In some or all embodiments, the first and second seal materials can be non-permeable polymeric materials.

In some or all embodiments, the first and second seal materials can be permeable polymeric materials.

In some or all embodiments, the first and second seal materials can include alternating layers of permeable and non-permeable polymeric materials aligned axially.

In some or all embodiments, the first and second seal materials can include channels on surfaces that face one another.

In some or all embodiments, the first and second seal materials can define an aperture into the vessel.

In some or all embodiments, a cavity can be provided adjacent to each of the first and second seal materials, and each cavity is filled with pressurized liquid that applies a constant pressure along one side of each of the seal materials.

Some embodiments are related to a seal, wherein the seal includes a structural member having a wedge-shaped chamber, wherein the chamber has a larger diameter that tapers toward a smaller diameter; a seal material within the chamber that assumes the shape of the wedge-shaped chamber, wherein the seal material includes a hole axially traversing the seal material; and a vessel connected to the seal, wherein the vessel contains a liquid under pressure, wherein the liquid exerts pressure on the seal material and compresses the seal material in the wedge-shaped chamber.

In some embodiments, the seal may include a cavity provided between the structural member and the seal material, wherein the cavity is filled with pressurized liquid that applies a constant pressure along one side of the seal material.

While gas selection depends entirely on the process and its purpose, the seal design is indifferent to the gas chosen. In the context of making micro-cellular and nano-cellular foams, the gas is absorbed in the polymer until a certain gas concentration is achieved. The size of the pressure vessel is adjusted in this case to allow sufficient residence time for the polymer sheet, film, or fiber to absorb the desired amount of gas.

Small amounts of liquid will typically leak between the polymer film or fiber and the sealing material. The formation of a liquid film or layer juxtaposed next to the film or fiber on both sides is a desirable effect since the liquid layer will create a pressure gradient along the opening in the axial direction and also aids in lubricating the polymer film or fiber as it exits through the seal. The small amount of liquid leakage can be controlled and pumped back into the high-pressure chamber for reuse.

The working principle of the seal is to create a very high resistance to the high-pressure gas but a very low resistance to the polymer film/fiber.

The seal can have further applications other than the processing of polymer thin films or fiber. Any solid material that is to be continuously removed from a high-pressure environment with minimal leakage could make use of the dynamic seal described in this disclosure.

The choices of sealing material and liquid have an impact on the performance of the seal. Also, the viscosity of the liquid is directly related to the leakage rate, and its lubrication characteristics have an effect on friction between the polymer and the sealing material.

Figure 2:
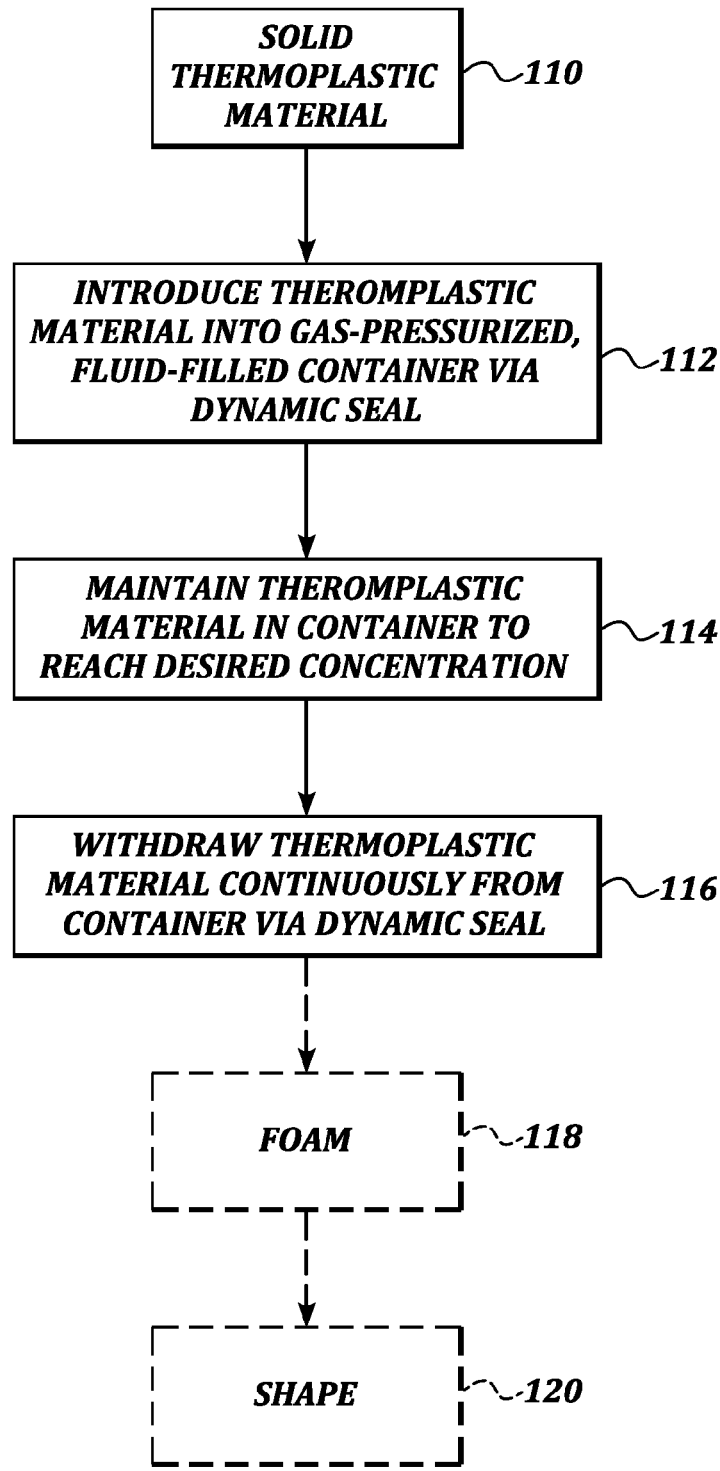
FIG. 2 is a flow diagram of a method according to one embodiment of the invention.

Referring to FIG. 2, a method is illustrated for passing a material from a pressurized vessel. In block 110, representative solid-state thermoplastic polymer materials include, but, are not limited to thermoplastics, such as polystyrene, high impact polystyrene, polyethylene terephthalate, polycarbonate, polyvinylchloride, polylactic acid. The material can either be a film or fiber; however, the method is not thereby limited. The thermoplastic material is introduced into a gas-pressurized, liquid-filled container via a seal. The thermoplastic material is characterized as a thin material, either in the thickness dimension if a film or sheet or a small diameter if a fiber. As used herein, "fiber" is encompasses any material having a thin diameter. Representative thicknesses of films and diameters of fibers can be in the range of 0.01 mm to 1 mm, including 0.05, 0.10, 0.15, 0.20, 0.25, 0.30, 0.35, 0.40, 0.45, 0.50, 0.55, 0.60, 0.65, 0.70, 0.75, 0.80, 0.85, 0.90, and 0.95, or any range derived therefrom.

Block 112 is for introducing a solid-state thermoplastic polymer material through an inlet seal into a vessel, while the vessel is already under pressure and has a liquid, the level of which is higher than the entrance of the inlet seal. Block 116 is for removing a solid-state thermoplastic polymer material through an outlet seal from the vessel, while the vessel is under pressure and contains a liquid, the level of which is higher than the outlet of the outlet seal.

For saturating the thermoplastic polymer material, a vessel may have both an inlet and outlet seal. In this case, the polymer material may be continuously introduced into and withdrawn from a gas-pressurized, liquid-filled vessel. The polymer material enters unsaturated through one seal and a gas-saturated polymer material exits through the second seal. The vessel has, on the inside, a retention device that allows the material to reside in the vessel within the gas space (above the liquid) for the time needed to saturate the polymer material. For example, a pressure vessel may include a spool that rolls the incoming unsaturated polymer material simultaneously while paying out gas-saturated polymer material. The amount of time that the polymer material resides on the spool is sufficient to saturate the material at the set gas pressure and temperature.

Alternatively, instead of an inlet and outlet seal, the vessel may have a single outlet seal for withdrawing the gas-saturated polymer material. In this case, the unsaturated polymer material, such as in a roll, can be placed into the liquid-filled vessel, and thereafter, the vessel may be sealed and pressurized once the polymer material is inside. The starting end of the polymer material is fed through the seal, and the seal may be clamped down against the polymer material. The vessel is then sealed and the gas is introduced. When determined to be saturated, the gas-saturated polymer material may be withdrawn from the vessel through the seal, without taking the entire roll out of the pressurized vessel and without having to de-pressurize the vessel.

Block 114 depicts the material being maintained at a pressure to reach a desired gas concentration within the pressure vessel, block 114. As mentioned above, unsaturated polymer material may be continuously fed to the vessel while simultaneously gas-saturated polymer material is withdrawn, or alternatively, gas-saturated material is withdrawn from the vessel. In either case, the time needed to reach a certain gas concentration can be determined beforehand. For example, various experiments may be performed where the polymer material is tested at a number of different gas pressures and at a number of different time intervals. The temperature can be room temperature. After each experiment, the material may be weighed. The difference in weight between the polymer material after saturation as compared to before saturation is an indication of the gas concentration of the material for the given gas pressure and time. When the polymer material ceases to increase in weight, the material may be considered saturated. A polymer material will reach a certain gas concentration for any given temperature and pressure. The time versus gas concentration for any thermoplastic polymer material can be determined experimentally, or is already well known. Once the time needed for saturation is known, the vessel can be built to provide the appropriate residence time. After the allotted time for gas absorption has passed, the gas-saturated polymer material is withdrawn from the vessel via a seal, block 116.

Additionally, if the gas-saturated material is to be created into a foam, the material may undergo a foaming step, block 118. When the gas-saturated thermoplastic polymer material is withdrawn from the pressure vessel continuously, instead of all at once, the material may have sufficient gas-concentration for foaming, despite the thin nature of the material. Placing a heater in proximity to or directly after the gas-saturated thermoplastic material exits the pressure vessel allows the foaming to occur before the film or fiber gas-saturated material is desorbed of too much gas. It is known that the glass transition temperature of the polymer material is lowered because of the gas absorbed in the polymer material. In order to foam the material, the temperature of the gas-saturated polymer is raised to a point where the cracks appear in the polymer's internal structure and the polymer's molecules move past each other providing nucleation sites where the gas fills in and begins to create cells. The rise in temperature causes the gas to diffuse from the surrounding area into the nucleation site which causes the cells to grow. The foaming process uses a temperature that does not melt the polymer, however. It is known that the gas concentration, heating time, and heating temperature may influence the cell structure. For example, these parameters may be varied to affect whether the cells are micro-sized or nano-sized, whether the cells are closed or open, and for adjusting the density of the resulting foam.

In block 120, once the gas-saturated polymer material is made into a foam, the foam may be shaped, such as via a molding process, in order to create a product, such as, but not limited to, containers, food trays, cups, and the like. Because of the cells contained in the foam, the foams can provide insulating properties to the products.

The seals for including either in the inlet, outlet or both of a vessel will be described in more detail with reference to FIGURES. Some embodiments of a seal may include a first structural upper member, a second lower structural member, wherein a first surface of the first structural member faces a second surface of the second structural member, a first seal material juxtaposed on the first surface of the first structural member, a second seal material juxtaposed on the second surface of the second structural member, wherein the first and second structural members are configured to be compressed toward one another to compress the first and second seal materials toward one another; and a vessel is connected to the seal, wherein the vessel contains a liquid under pressure, and the liquid exerts pressure between the surfaces of the first and second seal materials. While the structural members are rigid, non-deforming materials, the seal materials are deformable, and pliable to conform to a cross-sectional shape of either a film or fiber. The one or more seal materials form the opening for the inlet to the pressure vessel and/or the outlet to the pressure vessel.

Some embodiments of a seal may include a structural member having a wedge-shaped internal chamber, wherein the chamber has a larger diameter that tapers toward a smaller diameter, a seal material within the chamber that assumes the shape of the wedge-shaped chamber, wherein the seal material includes a hole axially traversing the seal material, and a vessel connected to the seal, wherein the vessel contains a liquid under pressure, wherein the liquid exerts pressure on the seal material and compresses the seal material in the wedge-shaped chamber. While the structural member is rigid, non-deforming material, the seal material is deformable, and pliable to conform to a cross-sectional shape of either a film or fiber.

Figure 3:
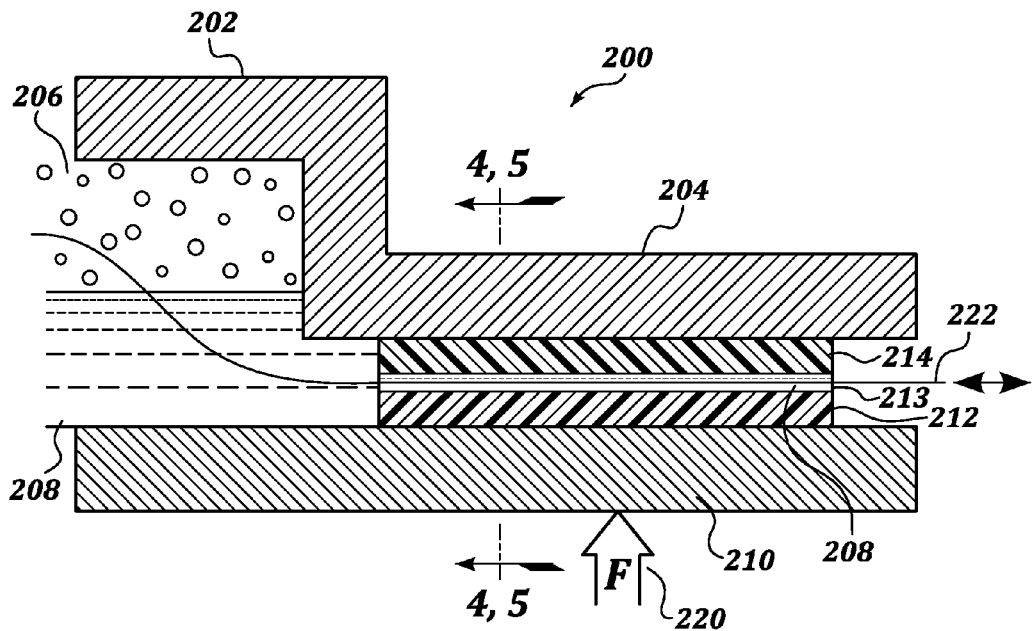
FIG. 3 is a diagrammatical illustration of a pressure vessel and seal according to one embodiment of the invention.

Referring to FIG. 3, a diagrammatical illustration of a seal is illustrated. The seal 200 provides an opening through which a material 222, such as a gas-saturated thin polymer, may be passed into or out of the vessel 202 without the loss of significant pressure from the vessel 202 and without significant loss of liquid 208 from the vessel 202. The opening is adjusted to a size around the material to limit the pressure and liquid escaping from the seal. The vessel 202 is designed to withstand the anticipated pressures for saturating thermoplastic materials described herein. For example, the pressure may be from 1 MPa to 25 MPa, or any narrower range inbetween. The literature contains ranges of pressures suitable for saturating a variety of polymer materials. A non-reacting gas 206, such as nitrogen or carbon dioxide, is used to pressurize the vessel 202. A gas source may be connected to the vessel 202 such that a pressure control valve may open or close depending on the sensed pressure within the vessel 202. The vessel is also filled partially with a liquid 208. The height of the level of the liquid 208 is at least higher than the opening out of the vessel 202. A suitable liquid 208 is water or any aqueous solution compatible with both the gas 206 and the thermoplastic polymer material 222. The liquid should have low solubility in the polymer, and the solubility of the gas is significantly higher in the polymer than the solubility of the liquid in the polymer or in the gas so that the liquid does not interfere with the diffusion of the gas into the polymer. A liquid source with a control valve may be used to maintain the liquid in the vessel 202 based on a level sensor to replenish any liquid that is lost through the seal. Additionally, any liquid that escapes through the seal may be collected and returned to the vessel 202. Significant loss of pressure and liquid is to be avoided that could not be compensated for by the pressure source and the liquid source control valves.

The seal 200 extends axially. Here, axially means a direction along the direction of travel of the thermoplastic polymer material 222. In the illustrated embodiment of FIG. 3, the seal is constructed from an upper structural plate 204 and a lower structural plate 210 that are connected to the vessel 202 in a pressure-tight manner. The upper structural plate 204 and the lower structural plate 210 can be parallel with respect to each other. Lining the respective upper plate 204 and lower plate 210 is an upper seal material 214 and a lower seal material 212. The upper seal material 214 and lower seal material 212 are juxtaposed and can be attached to the corresponding upper and lower plates 204, 210 so that the upper seal material 214 and the lower seal material 212 face each other. In some embodiments, the seal materials 212 and 214 are compressible to some extent so as to deform and assume the negative of the shape of the material 222 when compressed against the material 222. The upper plate and seal material 204, 214 along with the lower plate 210 and seal material 212 may be compressed toward each other to provide a sealing effect around the material 222. However, the upper plate and upper seal material and the lower plate and lower seal material are not compressed so much that the force to withdraw the material 222 is excessive to cause the material to break. On the other hand, the compression pressure between the upper plate and upper seal material and the lower plate and lower seal material is not so loose as to allow significant quantities of liquid to be expelled therebetween. Ideally, the pressure in the vessel 202 forces a liquid layer 208 interposed both between the upper side of the material 222 and the upper seal material 214 and between the lower side of the material 222 and the bottom seal material 212 when the material 222 moves axially. While the vessel is pressurized, the pressure of the liquid can drop linearly as a function of the seal material length, so that the pressure of the liquid at the exterior of the seal is at ambient pressure. A linear pressure drop is thought to create a uniform liquid layer that aids in lubrication of the material 222 as it passes through the seal. In order to achieve a linear pressure drop, the upper plate 204 and lower plate 210 and corresponding seal materials 214, 212 have to be essentially parallel to exert a uniform pressure over the surface area of the material 222. However, less than uniform pressure distribution may also create a seal sufficient to allow the material to be easily withdrawn without the loss of pressure and liquid from the seal.

Figure 4:
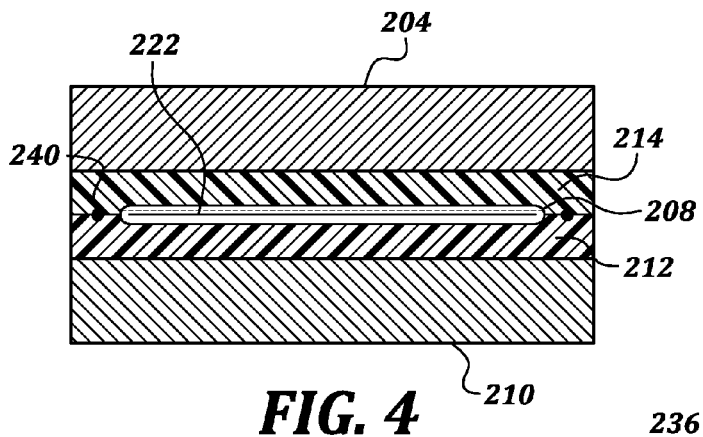
FIG. 4 is a diagrammatical illustration of a frontal cross section of a seal when the polymer is a film or sheet.

An aperture 213 is created between the upper seal material 214 and the lower seal material 212 through which a polymer material 222 is withdrawn and which allows liquid to leak through. Since the polymer material 222 may include films or fibers, the seal 200 can be shaped accordingly. For example, in FIG. 4, a seal is shown for the case where the material 222 is a film. As seen in FIG. 4, the material 222 is surrounded by a layer of liquid 208 directly and immediately in contact on the top and bottom sides of the material 222. The liquid layer 208 lubricates the material when moving through the aperture 213 created between the seal materials. It is to be appreciated that the figures are merely diagrammatical and are not drawn to any particular scale. The upper seal material 214 and the lower seal material 212 are shown surrounding the material 222 but are preferably not in contact with the material 222 during movement, as the aim is to create a liquid layer to allow lubrication as the material is passed through the seal. While the upper seal material 214 and the lower seal material 212 are shown as separate layers, the seal material can be formed of a single unitary polymer block with a slit cut into the block. The upper plate member 204 and the lower plate member 210 are generally rigid nondeflecting structural members to withstand the pressures reached inside the vessel and also to withstand the clamping force without deflection to apply a generally uniform pressure distributed on the material 222. The upper plate member 204 and the lower plate member 210 respectively press on the respective upper seal material 214 and lower seal material 212 such that the seal materials deflect into the shape of the material 222. The seal materials may be made from a solid (non-permeable), but deformable, polymer or a deformable permeable foam polymer with an open network of cells. A suitable material for the seal material is polyurethane, but others, may include, polyethylenes, polyamides, siloxanes, and the like. In order to seal the sides of the along the seal, a rigid rod 240, such as a wire, may be placed respectively along the axially-extending edges of the seal to prevent liquid from being expelled from the seal transversely. Alternatively, the upper and lower plates may include a ridge or bump extending axially that applies pressure against the seal materials to seal transversely.

Figure 5:
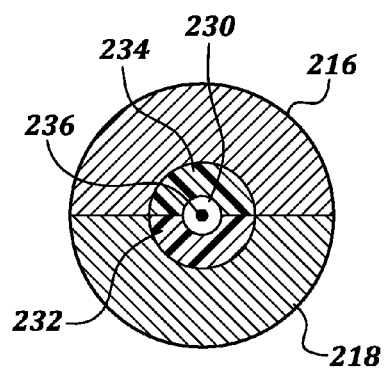
FIG. 5 is a diagrammatical illustration of a frontal cross section of a seal when the polymer is a fiber.

Referring to FIG. 5, a different seal configuration is shown in the case where the material 222 is a fiber 236. Similar to the seal described in association with FIG. 4, the seal of FIG. 5 includes a similar structural layering. However, the components are designed taking into consideration that the material 236 being withdrawn is a generally round material. The upper seal material 234 and the lower seal material 232 may be shaped as half cylinders. The upper plate member 216 and the lower plate member 218 may be similarly shaped as half cylindrical members. In either embodiment of FIG. 4 or FIG. 5, the upper plate and upper seal material may be compressed against the lower plate and seal material via various mechanisms. For example, hydraulics may be utilized in an automatically controlled manner. Alternatively, the upper and lower plates may be compressed via the use of manually tightened bolts, and the like. In another embodiment of a seal for a fiber, the seal material can be a cylinder with a hole bored through the axial center, and the cylinder is tightened around the circumference via the use of clamps.

Figure 6:
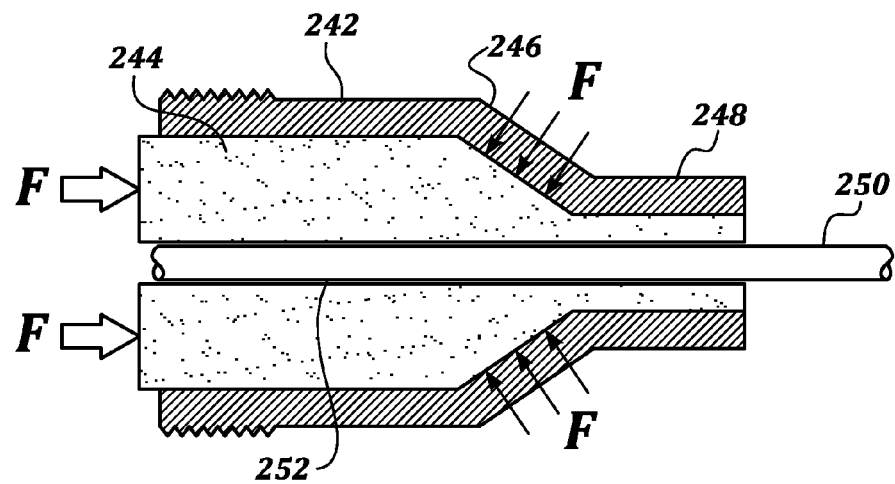
FIG. 6 is a diagrammatical illustration of a wedge-shaped seal according to one embodiment of the invention.

Referring to FIG. 6, another embodiment of a seal for use with a fiber is diagrammatically illustrated. In this embodiment, the structural member need not be divided into two halves. Instead, the structural member 242 includes a chamber having a cylinder with a first larger diameter connected to the pressure vessel (not shown). The larger diameter portion of the cylinder 242 is connected to a second smaller diameter portion 248 via a transition piece 246 that reduces in size from the first diameter to the second diameter. Thus, giving the cylinder a wedge-shape. The seal material 244 is shaped to have similar dimensions as the interior of the structural member and is fitted inside. The seal material 244 may have a central axial hole through which the material 250, such as a fiber, is passed. In this instance, an axial force may be applied on the seal material 224 in the axial direction. Such force is then directed by the transition piece 246 downward such that the force compresses the seal material 244 around the material 250. The axial force F may be brought about by screwing the seal into a port on the vessel such that the vessel wall is compressed against the end of the seal material 244, or the pressure inside the vessel may apply the axial force that compresses the seal material 244.

Figure 7A:
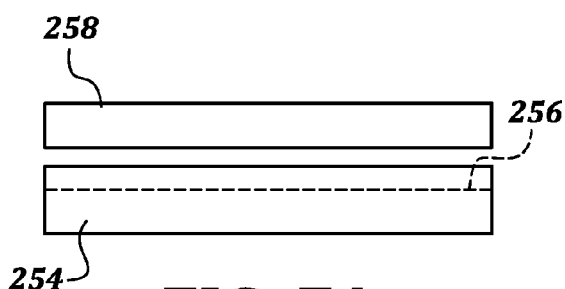
FIG. 7A is a diagrammatical illustration of a seal material according to one embodiment of the invention.
Figure 7B:
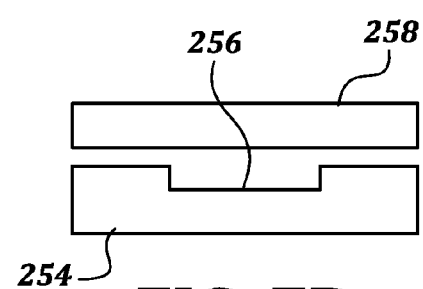
FIG. 7B is a diagrammatical illustration of the seal material of FIG. 7A.

Referring to FIGS. 7A and 7B, another embodiment of a first and second seal material is diagrammatically illustrated. Instead of a seal material that is deflected when compressed, in this case, the lower seal material 254 (or upper seal material) has been pre-shaped by having a permanent indentation 256 that matches the size of the material to be passed through the seal. The seal material 254 can be molded or machined to have the indentation 256. As seen in FIG. 7B, the indentation 256 would have the same width and/or thickness of any film that is to be passed through the seal. The seal material 254 can be made from cellular foam that has been molded specifically for the material or the foam can be pressed with a hard tool to form the indentation 256. Alternatively, the indentation 256 can be machined by cutting or milling out the indentation 256.

Figure 8:
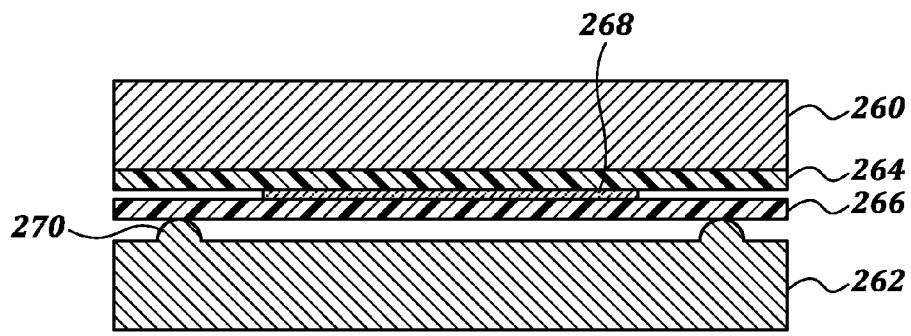
FIG. 8 is a diagrammatical illustration of a cross section of seal according to one embodiment of the invention.

FIG. 8 is a diagrammatical cross-sectional illustration of another embodiment of a seal. The seal includes a first upper plate 260, a lower plate 262, a first seal material 264 juxtaposed on the interior side of the upper plate 260, and a second seal material 266 juxtaposed next to the interior side of the lower plate 262. A film 268 is shown between the first and second seal materials 264, 266. In the embodiment shown in FIG. 8, the lower clamping plate 262 includes upward projecting bumps 270 on each transverse side of the plate 262. The upward projecting bumps 270 pinch the seal materials 266, 264 together and prevents liquid leakage through the transverse sides of the seal. Other alternatives to the bumps may include physical attachment of the seal materials 264 and 266 along the edges such as via glue or melting.

Figure 9:
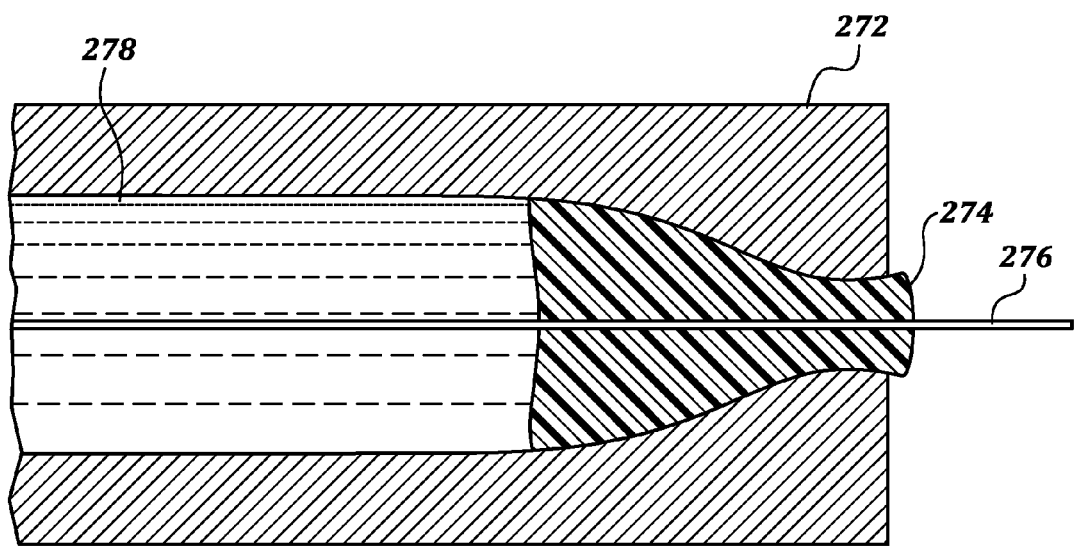
FIG. 9 is a diagrammatical illustration of a wedge-shaped seal according to one embodiment of the invention.

FIG. 9 diagrammatically illustrates another embodiment of a seal. In the embodiment of FIG. 9, the seal includes a rigid metal housing 272 as the structural member shaped in the form of a cylinder, and the interior of the metal housing includes a wedge shaped chamber. As used herein, wedge simply denotes a shape that has a larger diameter facing the high-pressure side of the vessel which tapers to a smaller diameter facing the outboard end of the seal. The tapered sides can have straight or smooth curves, or have both. A seal material 274 in the form of a wedge is placed within the chamber. The high pressure of the liquid 278 within the vessel (not shown) pushes the seal material 274 against the tapered sides of the wedge causing the seal material 274 to constrict around the film 276 (or a fiber). The tapered geometry of the wedge uses the high-pressure liquid 278 inside the vessel as the force to squeeze the seal material 274 onto the film 276 (or fiber) providing the sealing effect.

Figure 10:
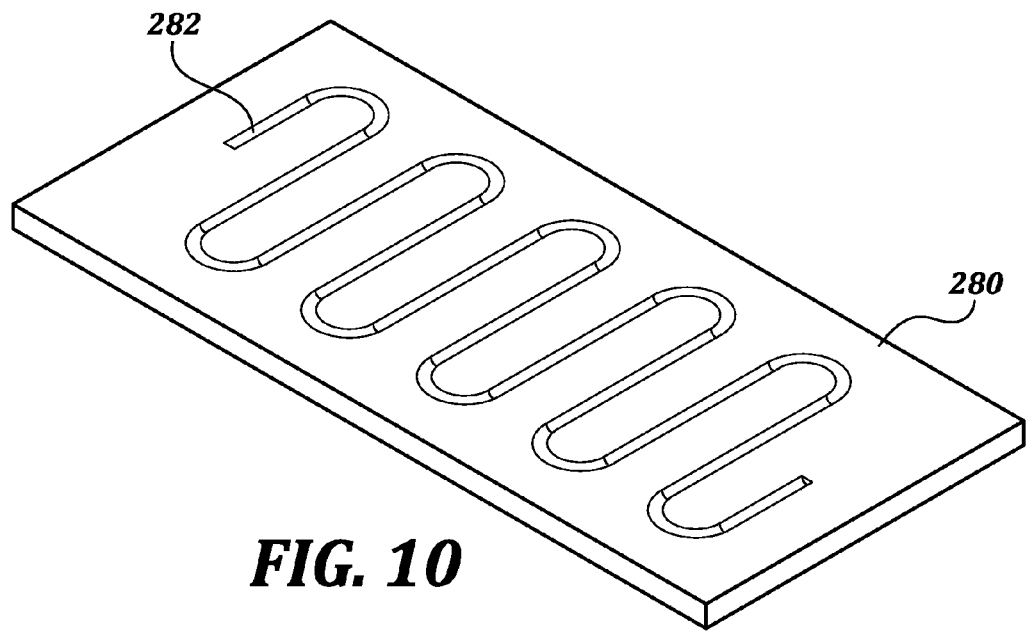
FIG. 10 is a diagrammatical illustration of a seal material according to one embodiment of the invention.

Referring to FIG. 10, one embodiment of a flat seal material 280 is diagrammatically illustrated. In this embodiment, the seal material 280 may have features added to help distribute the liquid between the seal material 280 and the film or fiber. In the embodiment illustrated in FIG. 10, a serpentine channel 282 is cut or formed on the surface facing the film. The serpentine channel acts to guide the liquid more evenly along the surface of the film. While the illustration shows a serpentine channel, the channels can be any shape including straight vertical, straight horizontal, diagonals, or a zigzag or X pattern.

Figure 11:
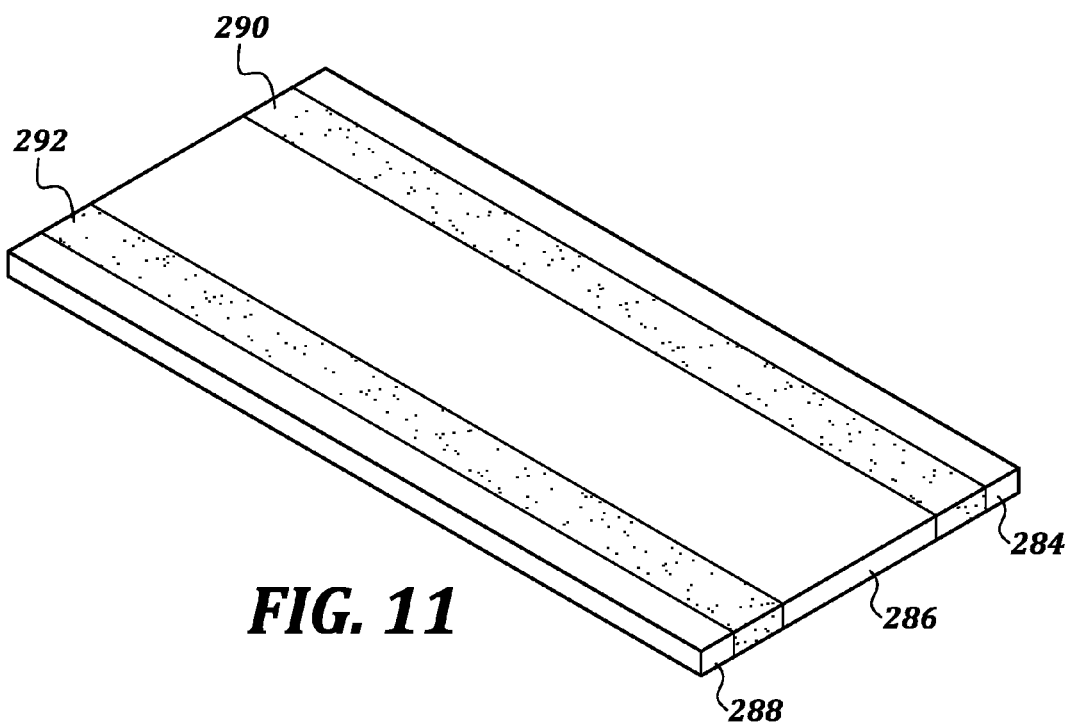
FIG. 11 is a diagrammatical illustration of a seal material according to one embodiment of the invention.

Referring to FIG. 11, another embodiment of a seal material is diagrammatically illustrated. In the embodiment of FIG. 11, the seal material is formed from a plurality of non-permeable layers 284, 286, and 288 alternating with permeable layers 290 and 292. The combination of a non-permeable seal material 284, 286, and 288 and permeable seal materials 290 and 292 regulate the pressure inside the seal to force a linear pressure drop from the entrance to the exit. The non-permeable materials may offer low friction, while the permeable materials may offer better control over the pressure drop.

The seal materials of FIGS. 10 and 11 may be used in any of the seals described herein.

Figure 12:
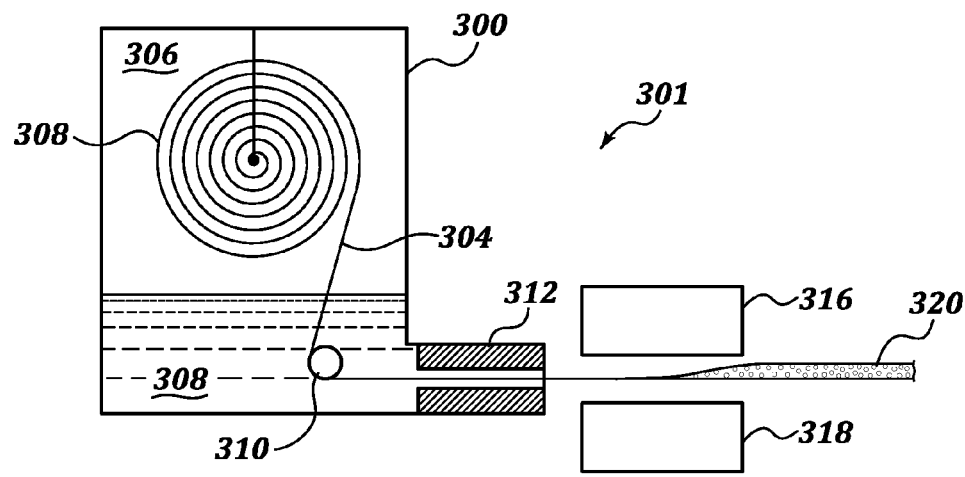
FIG. 12 is diagrammatical illustration of a pressure vessel, seal, and heater according to one embodiment of the invention.

Referring to FIG. 12, a diagrammatical illustration of a device 301 to saturate a roll of film, pass the gas-saturated film through a seal, and foam the gas-saturated film, is illustrated. In the case of saturating films with a gas, the films can be provided in rolls, for example. A pressure vessel 300 may be configured to hold the rolls 308 in the gas-filled space 306 of the vessel 300. An end of the film 304 may be threaded through roller 310 and out via the seal 312. Once the roll is placed within the vessel 300, the vessel may be closed, the liquid is then introduced to a level above the seal 312 opening, and the gas is introduced and raised to pressure determined previously. Then, the rolled polymer is allowed to absorb gas for the predetermined time desired to reach the final gas concentration. Once the gas concentration is determined to be suitable, the gas-saturated film is passed through the seal 312 and immediately heated by upper and lower ovens 316, 318 which produce a foamed film 320. Since the entire roll is not removed from the vessel, the roll remaining within the vessel will stay gas-saturated until ready to be foamed immediately after exiting the pressurized vessel. Seal 312 can be any one of the seals described herein.

Figure 13:
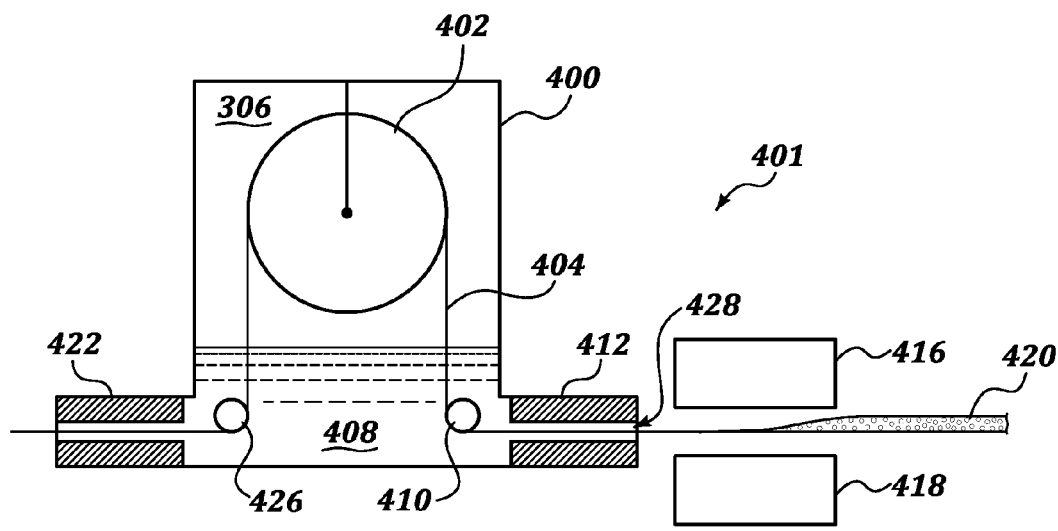
FIG. 13 is a diagrammatical illustration of a pressure vessel, seal, and heater according to one embodiment of the invention.

Referring to FIG. 13, a device 401 is diagrammatically illustrated for the introduction of a nonsaturated fiber polymer material into a pressurized vessel 400 simultaneously with withdrawing the gas-saturated fiber, and heating ovens for the foaming of a fiber. In the embodiment of FIG. 13, the vessel 400 includes a first seal 422 for the material 404 inlet and a second seal 412 for the material outlet. The seals 422 and 412 can be any one of the seals described herein. The vessel 400 may include a revolving drum 402 with a helical groove which winds and unwinds the continuous fiber 404 at a pace that allows the fiber 404 to become saturated to the desired gas concentration by the time spent rolling and unwinding along the drum 402. In this case, the fiber is threaded through the inlet seal 422, the inlet roller 426, the drum 402, the outlet roller 410, and the outlet seal 412 in preparation for use. The vessel is then closed, filled with liquid and gas, and pressurized to the desired pressure. When the starting portion of the fiber is determined to be saturated, the drum may begin revolving to continuously provide gas-saturated fiber for foaming. Further, additional fiber length can be added as the fiber nears its end by welding multiple fiber lengths together to avoid stoppage. Such welding can take place prior to the fiber entering the pressure vessel. A similar technique can be used to add length to films. Any adhesive (e.g., tape) may also be used for connecting films and fibers of finite length into one continuous length that can avoid stoppage of production of saturated films and fibers. The drum 402 passes the fiber into the gas-pressurized, liquid-filled vessel 400 while the gas-saturated fiber is simultaneously withdrawn from the vessel 400 using another drum (not shown), for example. Immediately following the outlet seal 412, the gas-saturated fiber is passed through an upper and lower oven 416, 418 to create a foamed fiber 420.

Figure 14:
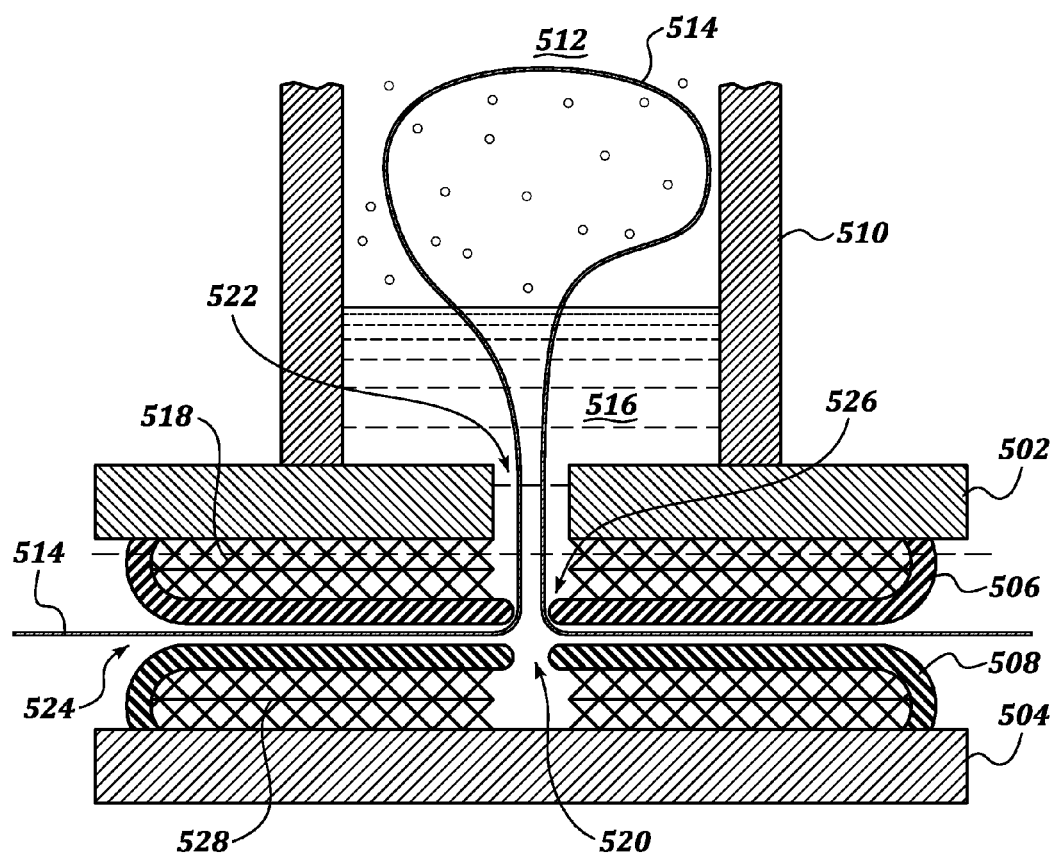
FIG. 14 is a diagrammatical illustration of a pressure vessel and seal according to one embodiment of the invention.

Referring to FIG. 14, another embodiment of a seal is diagrammatically illustrated. A pressure vessel 510 includes a gas space 512 and a liquid space 516. The seal is a dual purpose seal that serves both as an inlet and outlet from the pressure vessel. The seal includes an upper structural plate 502 and a lower structural plate 504. The upper structural plate 502 and the lower structural plate 504 can be parallel with respect to each other. The lower end of the vessel 510 rests on the upper surface of the upper structural plate 502. The seal includes an upper seal material 506 and a lower seal material 508. The seal provides an aperture 524 formed between the upper seal material 506 and the lower seal material 508 for the introduction of a material 514 from one direction simultaneously with the withdrawal of the material 514 in another direction, after the material 514 has resided in the vessel 510 for a desired length of time. The aperture 534 is only large enough to allow the passage of the material 514 and for a thin layer of liquid to form between the material 514 and the seal materials 506 and 508, without the loss of a significant amount of liquid.

The upper seal material 506 and the lower seal material 508 may be constructed to have a cavity 518 and 528, respectively, between the surface of the respective structural plate and the seal material. In FIG. 14, the cavities 518, 528 are shown containing an optional permeable support scaffold. The cavity 518 of the upper seal material 506 is connected to the liquid space 516 via aperture 522 in the upper plate 502. The aperture 522 allows liquid from the vessel 510 into the cavity 518 of the upper seal material 506. The same aperture 522 that allows liquid into the cavity 518 of seal material 506 may also serve as the path for the material 514 into the vessel 510. An aperture 526 in the upper seal material 506 is aligned with the aperture 524 in the upper plate 502 to permit the passage of the material 514 therethrough. Similarly, the cavity 528 in the lower seal material 508 is connected to the liquid space of the vessel 510 through an aperture 520. The aperture 520 may be connected to the liquid space through, for example, a channel (not shown) that connects the aperture 520 to the aperture 522 in the upper plate 502. In this manner, the aperture 522 can feed both cavities 518, 528 in the upper and lower seal materials 502, 504, respectively.

Figure 15:
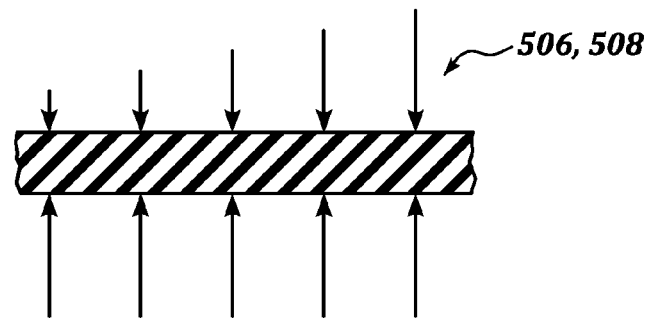
FIG. 15 is a diagrammatical illustration of pressure distribution along a seal material.

The cavities 518, 528 of the upper seal material 506 and lower seal material 508 being connected to the liquid space 516 allows the pressure from the liquid to be experienced on the high pressure side of the seal material, while the low pressure side (the side open to atmosphere) sees a decreasing pressure. As shown in FIG. 15, a representative seal material, such as 506 and 508, will experience a constant pressure (represented by arrows of similar length) on the side where the seal material cavity is connected to the liquid space 516. However, the pressure of the liquid that is leaking out along the polymer film/fiber 514 decreases along the length of the seal material from the high pressure of the vessel to atmospheric pressure. The higher pressure within the cavities will push against the respective seal materials to tighten the seal materials around the polymer film/fiber. However, the pressure does not completely shut off the liquid out of the seal, but can provide a self-sealing, self-regulating seal that minimizes leakage. The seal of FIG. 14 may also eliminate problems with non-parallel plates or uneven clamping of plates, because the liquid pressure on the sealing material compensates for any irregularity caused by non-parallel plates or an uneven clamping force.

Figure 16:
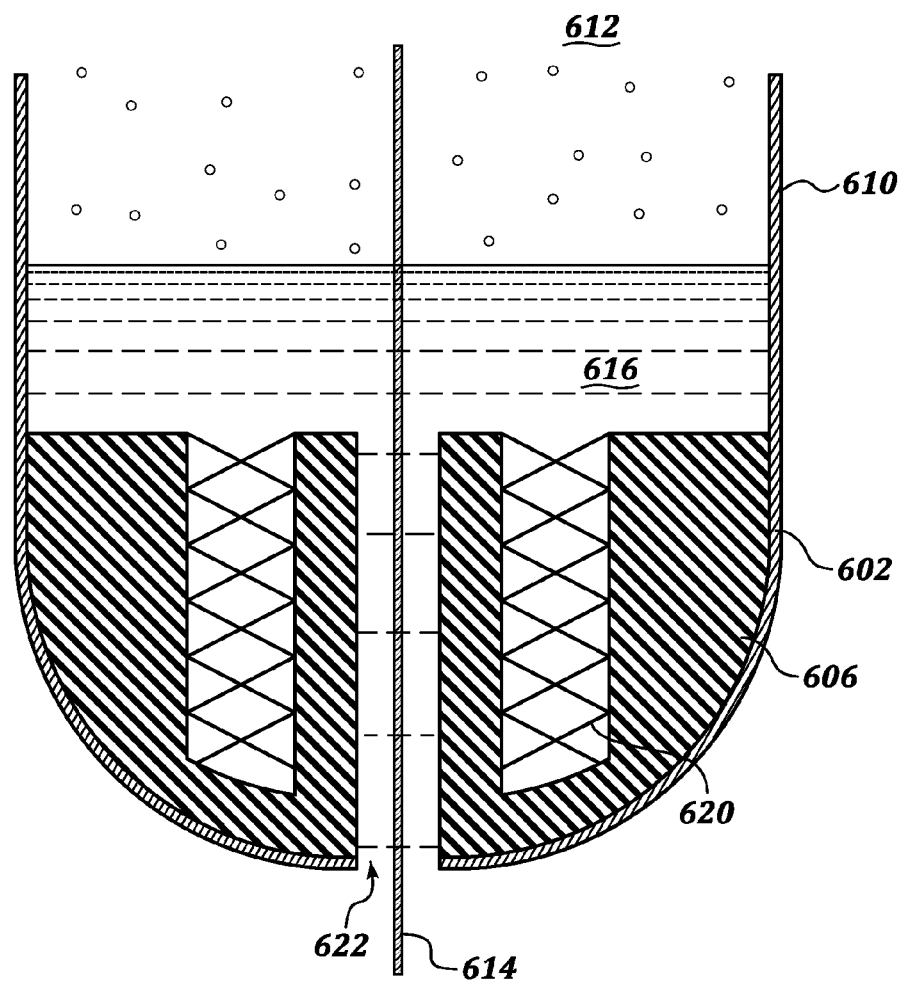
FIG. 16 is a diagrammatical illustration of a pressure vessel and seal according to one embodiment of the invention.

Referring to FIG. 16, another embodiment of a seal is illustrated. The vessel 610 includes a gas space 612 under pressure, a liquid space 616 below the gas space also under pressure. The vessel 610 may have a cylinder shape. The end of the vessel 610 has a dome shape 602 with an aperture 622 in the center. The interior of the vessel 610 defines a wedge-shaped chamber. The aperture 622 allows liquid 616 to slowly leak out from the vessel, and also serves to withdraw the film or fiber 614 from the vessel 610. A wedge-shaped seal material 606 is placed within the dome shaped end 602 in the wedge-shaped chamber. The aperture 622 extends axially through the wedge-shaped seal material 606 into the vessel 610. A cavity 620 in the shape of a cylinder is made axially in the wedge-shaped seal material 606 so as to leave a layer of seal material surrounding the aperture 622. In one embodiment, the cavity 620 does not include a support scaffold. In another embodiment, the cavity 620 can include a permeable support scaffold. In either case, the cavity 620 is filled with liquid from the liquid space 616. The pressurized liquid within the cavity 620 applies pressure against the sides of seal material surrounding the aperture 622. While the pressure on the high-pressure side of this layer of seal material is substantially constant, the pressure on the exterior side (along the aperture 622) of the seal material gradually decreases from a high pressure to atmospheric pressure as the liquid exits the aperture 622.

EXAMPLES

Two aluminum plates were held in a generally parallel orientation with respect to each other. A porous (permeable) polymer sealing material is placed on the inside surface of each aluminum plate. The aluminum plates are held with a series of bolts along the transverse sides of the plates. One aluminum plate (the upper plate) has a port in the center to accept a pressurized liquid. The port extends through the upper sealing material. The top aluminum plate includes ports in both directions extending from the center port. A total of three ports are drilled on each side of the center port extending axially. The six ports were coupled to sensors to read pressure. A film was captured between the seal materials, and the pressurized liquid was turned on so that the liquid was distributed between the upper and lower surfaces of the film and the seal materials.

Figure 17:
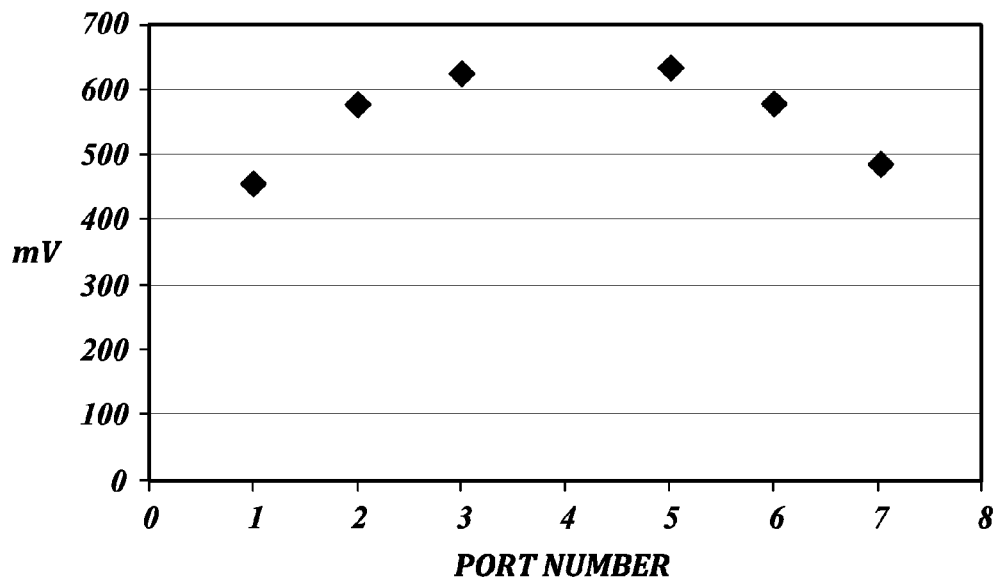
FIG. 17 is a graph depicting a pressure profile of a seal according to one embodiment of the invention.
Figure 18:
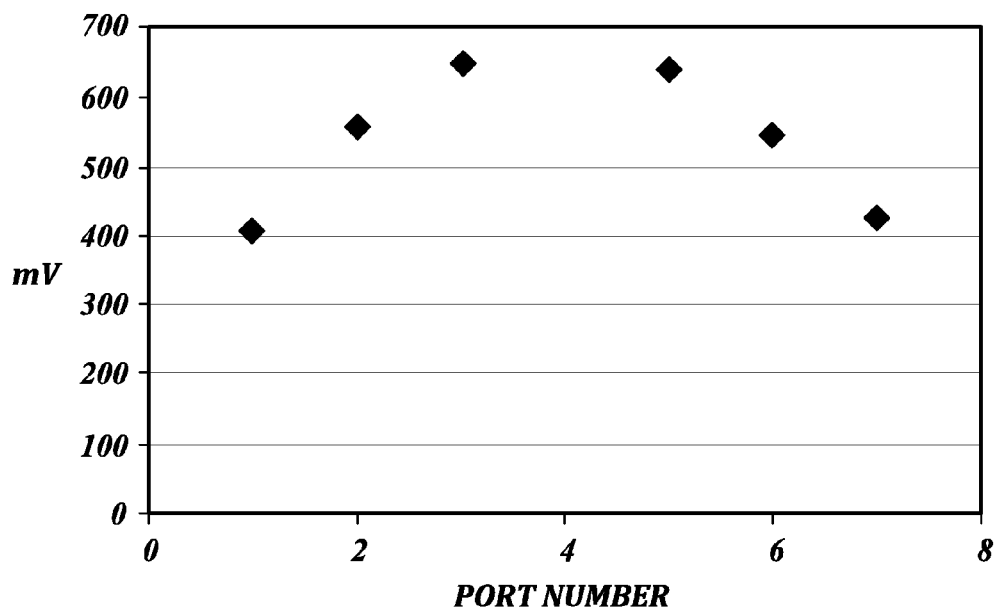
FIG. 18 is a graph depicting a pressure profile of a seal according to one embodiment of the invention.

FIGS. 17 and 18 show plots of voltage (mV) representing pressure versus distance as expressed by port number from the central pressure port (no. 4 on the horizontal axis). While the FIGURES generally show a linear relationship, the pressure profile can be altered with the clamping force of the bolts. Tightening any one of the bolts may severely alter the pressure at a particular sensor port.

Nevertheless, the prototype seal described above allowed the film to move through very easily when liquid pressure is applied, otherwise, the clamping force keeps the film locked in place.

The liquid leakage is very small, and the force required to pull the polymer film/fiber through the seal is also small. Liquid pressures of up to 5.17 Mega Pascal (750 psi) have been successfully sealed by a lab prototype while allowing a fiber to be drawn out by hand.

While illustrative embodiments have been illustrated and described, it will be appreciated that various changes can be made therein without departing from the spirit and scope of the invention.

The invention claimed is:

1. A seal, comprising:
   a first structural member;
   a second structural member, wherein a first surface of the first structural member faces a second surface of the second structural member;
   a first seal material is juxtaposed on the first surface;
   a second seal material is juxtaposed on the second surface, wherein the first and second structural members are configured to be compressed toward one another to compress the first and second seal materials toward one another;
   a vessel connected to the seal, wherein the vessel contains a liquid under pressure, wherein the liquid exerts pressure between the surfaces of the first and second seal materials; and
   a film or sheet between the first and second seal materials, a first liquid layer between the first seal material and the film or sheet, and a second liquid layer between the second seal material and the film or sheet, wherein the vessel supplies the liquid between the first and second seal materials and the film or sheet.

2. The seal of claim 1, wherein the first and second structural members are parallel.

3. The seal of claim 1, wherein the first and second seal materials are non-permeable polymeric materials.

4. The seal of claim 1 wherein the first and second seal materials are permeable polymeric materials.

5. The seal of claim 1, wherein the first and second seal materials include alternating layers of permeable and non-permeable polymeric materials aligned axially.

6. The seal of claim 1, wherein the first and second seal materials include channels on surfaces that face one another.

7. The seal of claim 1, wherein the first and second seal materials define an aperture into the vessel.

8. The seal of claim 1, wherein a cavity is provided adjacent to each of the first and second seal materials, and each cavity is filled with pressurized liquid that applies a constant pressure along one side of each of the seal materials.

9. A seal, comprising:
   a structural member having a wedge-shaped chamber, wherein the chamber has a larger diameter that tapers toward a smaller diameter and tapered sides connecting the larger diameter of the chamber to the smaller diameter of the chamber;
   a seal material within the chamber that assumes the shape of the wedge-shaped chamber, wherein the seal material includes a hole axially traversing the seal material, and the hole in the seal material is aligned with an opening in the chamber passing through the small diameter of the chamber; and
   a vessel connected to the seal, wherein the vessel contains a liquid under pressure, wherein the liquid exerts pressure on a side of the seal material that is opposite from the tapered sides of the chamber, and the liquid pressure compresses the seal material in the wedge-shaped chamber to constrict the hole in the seal material.

10. The seal of claim 9, further comprising a cavity provided between the structural member and the seal material, wherein the cavity is filled with pressurized liquid that applies a constant pressure along one side of the seal material.

* * * * *